(12) United States Patent
Kamamori

(10) Patent No.: US 9,378,573 B2
(45) Date of Patent: Jun. 28, 2016

(54) INFORMATION PROCESSING APPARATUS AND CONTROL METHOD THEREOF

(71) Applicant: CANON KABUSHIKI KAISHA, Tokyo (JP)

(72) Inventor: Yuki Kamamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 398 days.

(21) Appl. No.: 13/907,037

(22) Filed: May 31, 2013

(65) Prior Publication Data

US 2013/0322785 A1    Dec. 5, 2013

(30) Foreign Application Priority Data

Jun. 4, 2012 (JP) .................. 2012-127144

(51) Int. Cl.
| | | |
|---|---|---|
| G06K 9/03 | (2006.01) | |
| G06T 11/60 | (2006.01) | |
| G06F 3/0484 | (2013.01) | |
| G06F 3/042 | (2006.01) | |
| G06F 3/0486 | (2013.01) | |
| G06F 3/0488 | (2013.01) | |

(52) U.S. Cl.
CPC .............. *G06T 11/60* (2013.01); *G06F 3/0425* (2013.01); *G06F 3/0484* (2013.01); *G06F 3/0486* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 6,331,840 | B1 * | 12/2001 | Nielson et al. | 345/1.1 |
| 2010/0279738 | A1 * | 11/2010 | Kim et al. | 455/566 |

* cited by examiner

*Primary Examiner* — Stephen R Koziol
*Assistant Examiner* — Amandeep Saini
(74) *Attorney, Agent, or Firm* — Canon USA Inc. IP Division

(57) ABSTRACT

In an image processing apparatus, an image including an object is displayed on an operation surface. A position in the image that is designated by a user input is recognized. When the object is displayed at the recognized position, different editing operations with respect to the object are accepted according to the length of duration during which the position is continuously designated. As the different editing operations, at least a copying operation to copy the object and a cutting operation to cut the object from the image are distinctively accepted.

19 Claims, 9 Drawing Sheets

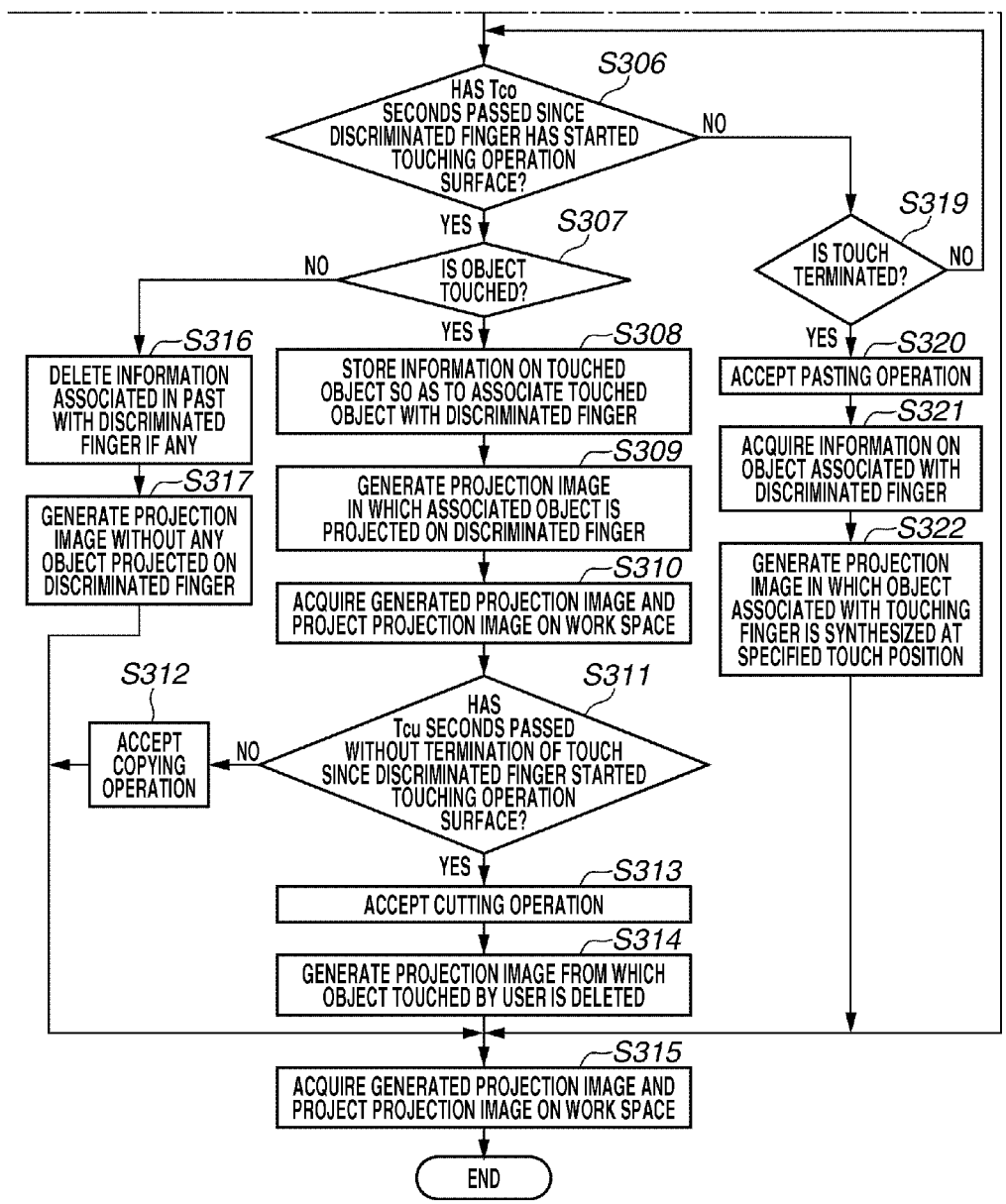

3a

3b

USER TOUCHES
ARBITRARY POSITION
ON OPERATION SURFACE
USING RIGHT FOREFINGER

3c

USER REMOVES
FOREFINGER FROM
OPERATION SURFACE
WITHIN ONE SECOND

HEART OBJECT HELD AS
OBJECT ASSOCIATED WITH
FOREFINGER IS PROJECTED
ON TOUCH POSITION

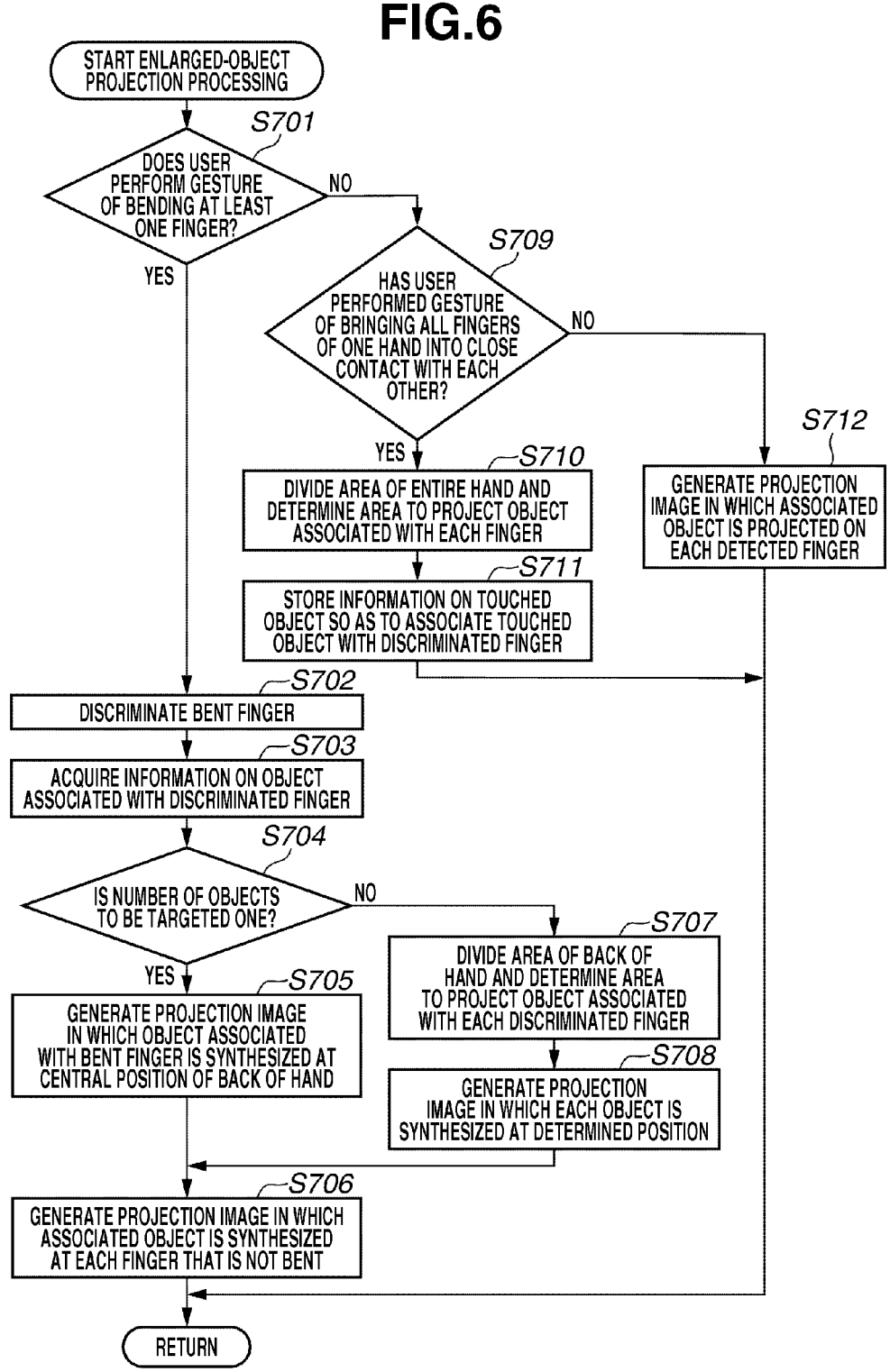

FIG.7A

4a
OBJECTS ARE PROJECTED IN SMALL SIZE ON RESPECTIVE FINGERS

4b
OBJECT ASSOCIATED WITH BENT FINGER IS PROJECTED IN ENLARGED SIZE ON CENTRAL PART OF BACK OF HAND

FIG.7B

5a
OBJECTS ARE PROJECTED IN SMALL SIZE ON RESPECTIVE FINGERS

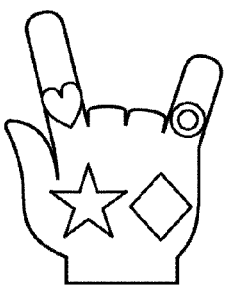
5b
OBJECTS ASSOCIATED WITH BENT FINGERS ARE PROJECTED NEXT TO EACH OTHER IN ENLARGED SIZE ON BACK OF HAND

FIG.7C

6a
OBJECTS ARE PROJECTED IN SMALL SIZE ON RESPECTIVE FINGERS

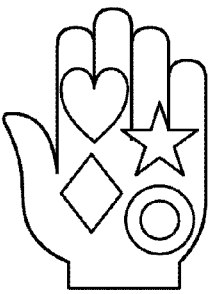
6b
OBJECTS ASSOCIATED WITH ALL FINGERS OF RIGHT HAND ARE EVENLY PROJECTED IN SAME SIZE ON AREA OF ENTIRE HAND INCLUDING FINGERS

INFORMATION PROCESSING APPARATUS AND CONTROL METHOD THEREOF

BACKGROUND OF THE INVENTION

1. Field of the Invention

The present invention relates to an information processing apparatus configured to operate a plurality of objects.

2. Description of the Related Art

A user interface system has been used that allows intuitive operations through recognition of user gestures with respect to a video image projected by a projector. Such a system uses a touch panel and a video image recognition technique to recognize a user gesture performed on a projected video image.

In "Goshiro Yamamoto, Huichuan Xu, and Kosuke Sato, "Desktop Accessing by Superimposed Silhouette of the Palm", Interaction, 2008" (hereinbelow, referred to as Non-patent document 1), the position and movement of a user's hand is detected to project a silhouette of the user's hand onto a projected video image. Then, user gestures of "grasping" and "releasing" the hand and the positions of the hand at that time are detected to recognize an operation of moving icons projected on a desktop in response to a movement of a silhouette grasping and moving the icons. Furthermore, the moved icons are projected on a user's palm to realize intuitive operations of grasping and moving the icons.

Conventionally, there has not been established a technique that allows intuitive operations on a plurality of icons. In the case of Non-patent document 1 described above, for example, when the user desires to move a plurality of icons (objects) in random order, the user needs to repeat the movements, i.e., grasping, moving, and opening the hand.

SUMMARY OF THE INVENTION

The present invention is directed to an information processing apparatus capable of improving operability in operations of a plurality of objects.

According to an aspect of the present invention, an information processing apparatus includes: a display control unit configured to display an image including an object on an operation surface; a recognition unit configured to recognize a position in the image which is designated by an input from a user; and an acceptance unit configured to accept different editing operations with respect to the object according to a length of duration during which the position recognized by the recognition unit is continuously designated, when the object is displayed at the position recognized by the recognition unit, wherein the acceptance unit distinctively accepts as the different editing operations at least a copying operation to copy the object and a cutting operation to cut the object from the image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flow chart illustrating a flow of enlarged-object projection processing executed by the information processing apparatus.

FIGS. 7A to 7C illustrate how information held by the information processing apparatus is provided to a user.

DESCRIPTION OF THE EMBODIMENTS

Various exemplary embodiments, features, and aspects of the invention will be described in detail below with reference to the drawings. It is to be noted that the following exemplary embodiment is merely one example, and the scope of the present invention is in no way limited to the following exemplary embodiment.

In an exemplary embodiment, an editing operation performed on electronic data projected on a workspace by a projector is described. In the present exemplary embodiment, electronic data on which the editing operation is performed is electronic document data including an object such as a character and an image.

Figure 1A:
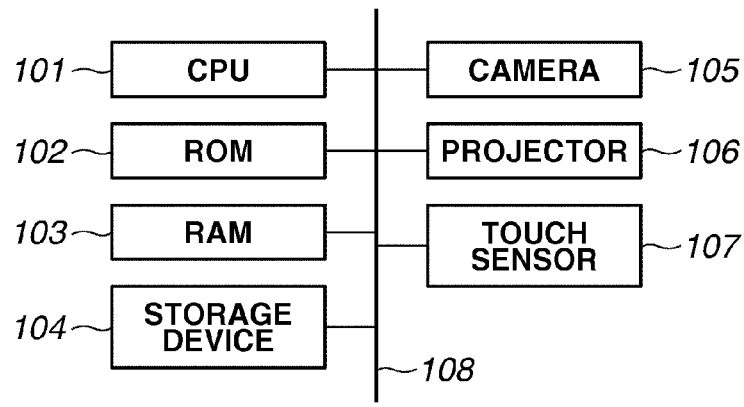
FIG. 1A illustrates an example of a hardware configuration of an information processing apparatus.

FIG. 1A is a block diagram illustrating a hardware configuration of an information processing apparatus according to the present exemplary embodiment. In FIG. 1A, a central processing unit (CPU) 101 executes calculations and logical decisions for various types of processing and controls each component connected to a system bus 108. A read-only memory (ROM) 102 is a program memory configured to store programs for causing the CPU to execute controls including various processing procedures described below. A random access memory (RAM) 103 is a data memory including a work area of the CPU 101 for the programs, a data saving area for error processing, and a loading area for the control programs. A storage device 104 includes a hard disk and an externally connected storage device. The storage device 104 stores various types of data such as electronic data and programs according to the present exemplary embodiment. A camera 105 captures an image of a workspace where a user performs an operation. The camera 105 provides the captured image as an input image to a system. A projector 106 projects a video image including electronic data and a user interface component onto a workspace. The workspace is a space between the projector 106 and an operation surface for projecting electronic data. The projector 106 is also capable of projecting a video image onto a hand of a user performing a gesture on the workspace. A touch sensor 107 is, for example, an infrared sensor and detects a touch of a real object on the operation surface based on the distance between the real object in the workspace and the operation surface.

The present exemplary embodiment will describe an example of the information processing apparatus in which the projector 106 projects a single projection image on the workspace including a hand of a user and the operation surface onto which electronic data is to be projected. However, the information processing apparatus may include a plurality of projectors 106. In this case, different projectors 106 project video images onto the operation surface and the hand of the user, respectively, whereby the video images can be projected more accurately onto target objects located at various distances from the projector 106.

Figure 1B:
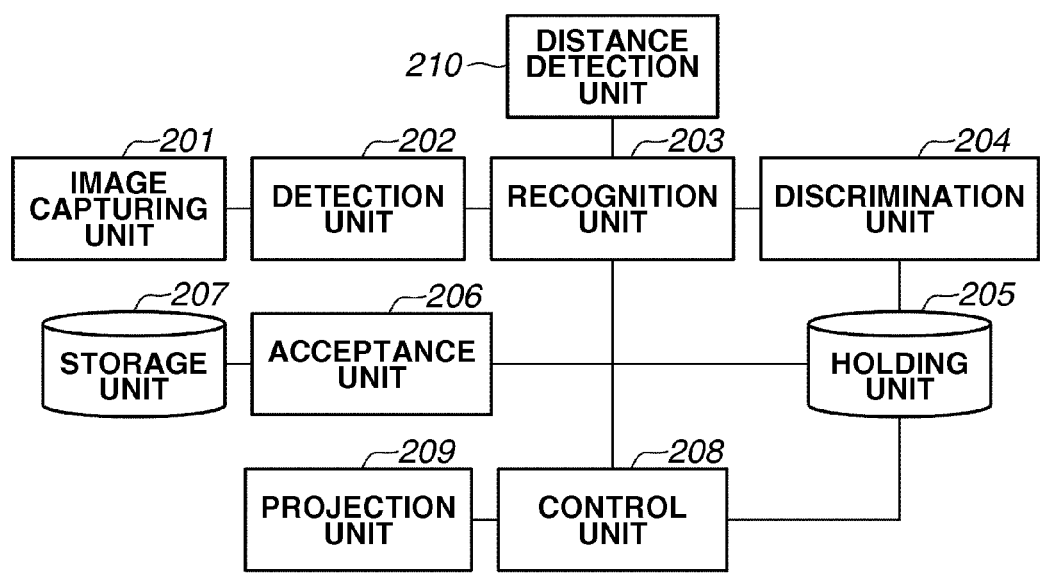
FIG. 1B illustrates an example of a software configuration of the information processing apparatus.

FIG. 1B illustrates a functional configuration of the information processing apparatus according to the present exemplary embodiment. In FIG. 1B, an image capturing unit 201 captures an image of the work space including the operation surface and the hand of the user through the camera 105. A detection unit 202 includes a CPU, a ROM, and a RAM (hereinafter, CPU and the like) and detects an area where the hand of the user is shown and an area where fingers of the hand of the user are shown in the video image captured by the image capturing unit 201. This will be referred to as detection of the hand of the user and detection of the fingers of the hand of the user, hereinafter. A recognition unit 203 includes a CPU and the like. The recognition unit 203 traces the hand and the fingers of the user that are detected by the detection unit 202 in the video image captured by the image capturing unit 201, thereby recognizing a gesture operation performed by the user. Gestures to be recognized by the recognition unit 203 are registered in advance in the information processing apparatus. In the present exemplary embodiment, the recognition unit 203 also recognizes a touch operation, which is a touch on the operation surface performed by the user, as a gesture operation. At this time, information on a position designated through the touch operation is also recognized as operation information. A discrimination unit 204 includes a CPU and the like. The discrimination unit 204 discriminates a finger among the fingers of the user that is used to perform the operation recognized by the recognition unit 203. A holding unit 205 includes a CPU and the like. Among objects included in the projected electronic data, the holding unit 205 holds information on an object on which the gesture operation is performed by the user. The holding unit 205 holds the information in a storage area provided in the RAM 103 in such a manner that the information is associated with the finger used to perform the gesture operation. An acceptance unit 206 includes a CPU and the like. The acceptance unit 206 distinctively accepts different editing operations instructed to be performed on electronic data by the gesture operation recognized by the recognition unit 203. As necessary, the acceptance unit 206 updates electronic data stored in a storage unit 207. In the present exemplary embodiment, the acceptance unit 206 distinctively accepts an object copying operation and an object cutting operation according to, especially, a period for which the user continues touching a position where the object in the electronic data (duration of touch operation) is displayed. The duration of a touch operation for accepting a cutting operation is longer than the duration of a touch operation for accepting a copying operation. The holding unit 205 holds the object that is a target of the copying operation or the cutting operation such that the object is associated with the finger used to perform the touch operation. Further, when the user touches an arbitrary position on the electronic data for a period shorter than the duration of a touch operation for accepting a copying operation, the acceptance unit 206 in the present exemplary embodiment accepts a pasting operation with respect to the object associated with the finger used to perform the touch operation. The storage unit 207 includes the storage device 104 and stores electronic data that is a target of an editing operation. A control unit 208 includes a CPU and the like. In response to the gesture recognized by the recognition unit 203, the control unit 208 refers to the information held by the holding unit 205 to generate a projection image to be projected on the workspace. A projection unit 209 projects, through the projector 106, the projection image generated by the control unit 208 onto the workspace including the operation surface and the hand of the user. A distance detection unit 210 includes the touch sensor 107 and a CPU and the like. Based on detection of the distance between the hand of the user detected by the detection unit 202 and the operation surface, the distance detection unit 210 notifies the recognition unit 203 that the user touches the operation surface. In the present exemplary embodiment, hardware as a substitution for the above-described software processing using the CPU 101 may be configured to include a calculation unit and a circuit configured to correspond to the functions (processing units) described herein.

The function of holding information on an object that is a target of a copying operation, a cutting operation, or a pasting operation in a storage area, as in the present exemplary embodiment, is sometimes referred to as a clipboard function. In the present exemplary embodiment, the copying operation refers to the act of copying information on an object included in electronic data to a clipboard; that is to say, the act of holding the information on the object in the holding unit 205. Accordingly, the copying operation does not involve any change in the display state of the object on the electronic data. Further, in the present exemplary embodiment, the cutting operation refers to the act of cutting information on an object included in electronic data; that is to say, the act of copying the information on the object to a clipboard and deleting the information from the electronic data. Accordingly, when the cutting operation is performed, the information on the object included in the electronic data is held by the holding unit 205 while the object is deleted from the projection image.

Figure 1C:
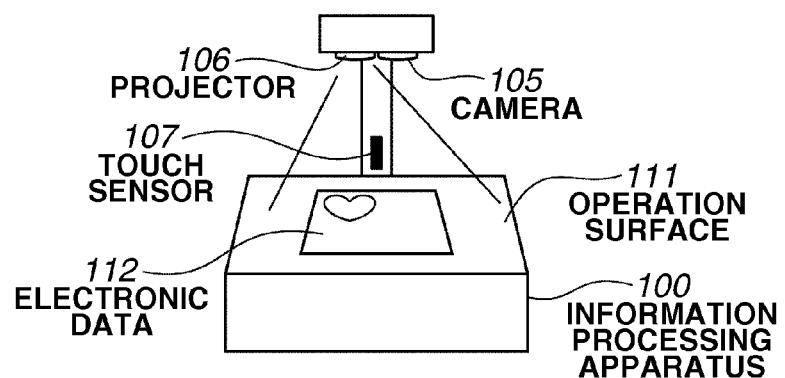
FIG. 1C illustrates an appearance of the information processing apparatus.

FIG. 1C illustrates an example of an appearance of the information processing apparatus according to the present exemplary embodiment. In the present exemplary embodiment, the projector 106 is placed over an operation surface 111 and projects from above a projection image including electronic data 112. The camera 105 is also placed over the operation surface 111 and recognizes a user gesture operation based on a captured overhead video image.

Figure 2:
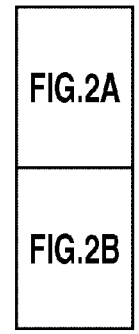
FIG. 2 (2A+2B) is a flow chart illustrating an example of a flow of processing of controlling an electronic data editing operation executed by the information processing apparatus.
Figure 2A:
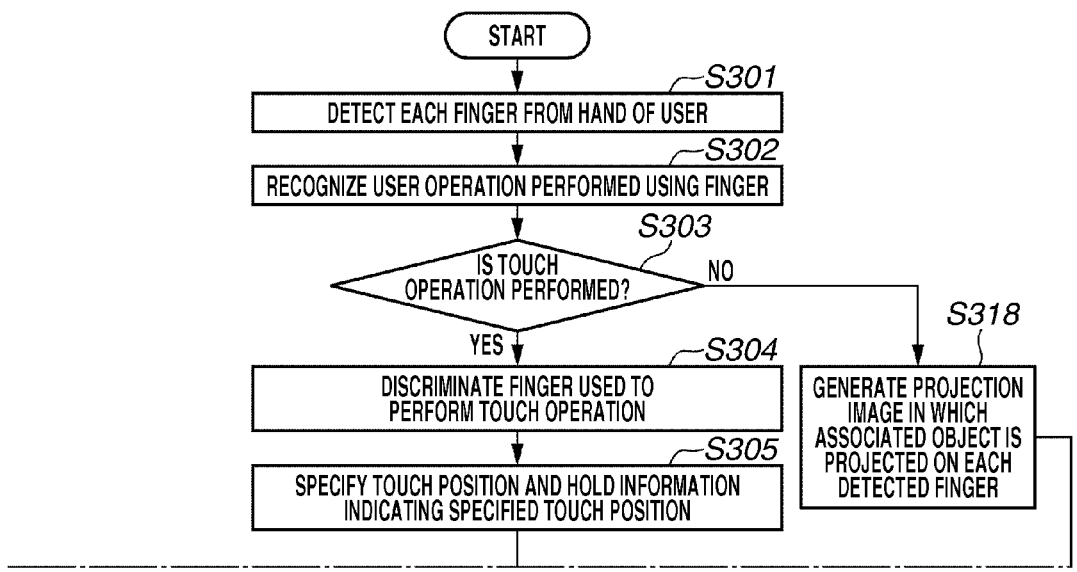

FIG. 2 (2A+2B) is a flow chart illustrating a flow of processing of controlling an electronic data editing operation executed by the information processing apparatus according to an exemplary embodiment of the present invention. The CPU included in each function unit of the information processing apparatus loads into the RAM a program stored in the ROM to execute the program, thereby realizing the processing. The processing is activated in response to detection of the hand of the user in the video image of the workspace captured by the detection unit 202 when the information processing apparatus projects the electronic data through the projection unit 209.

In step S301, the detection unit 202 further detects the fingers of the user from the detected hand of the user. The detection unit 202 in the present exemplary embodiment detects a moving object based on a difference between previous and subsequent frames of the video image of the workspace captured at every certain period by the image capturing unit 201. Then, the detection unit 202 detects the hand of the user through pattern matching of the shape of the area where the moving object is shown with data on the shape of a human hand learned in advance. Furthermore, based on the results of pattern matching, the detection unit 202 analyzes the video image captured by the image capturing unit 201, distinguishes between the back portion and finger portions of the hand of the user, and detects each finger of the user.

In step S302, the recognition unit 203 traces each finger of the user in the work space to recognize a predetermined gesture performed by the user with his finger. In the present exemplary embodiment, when the distance detection unit 210 notifies the recognition unit 203 that a traced finger of the user touches the operation surface, the recognition unit 203 recognizes that the user touches a portion on the operation surface to input a touch operation.

In step S303, the recognition unit 203 determines whether the user has touched a portion of the projected electronic data to perform a touch operation. In the present exemplary embodiment, when the distance detection unit 210 notifies the recognition unit 203 that the user touches the operation surface using his finger because the distance between the finger of the user detected by the detection unit 202 and the operation surface is equal to or smaller than a predetermined threshold value, the recognition unit 203 determines that the user has performed a touch operation. If the recognition unit 203 determines that the user has performed a touch operation (YES in step S303), then the processing proceeds to step S304. On the other hand, if the recognition unit 203 determines that the user has not performed a touch operation (NO in step S303), then the processing proceeds to step S318.

In step S304, the discrimination unit 204 discriminates the finger used to perform the touch operation. In the present exemplary embodiment, the discrimination unit 204 specifies a finger that is at a distance equal to or smaller than a predetermined value from the operation surface, among the fingers of the user detected by the detection unit 202. Then, based on the relative position of the specified finger with respect to the back portion of the hand of the user detected by the detection unit 202, the discrimination unit 204 discriminates the finger that touches the operation surface and holds information indicating the discriminated finger. For example, the finger positioned at the center of the back of a right hand can be discriminated as a middle finger, and the rightmost finger can be discriminated as a little finger. However, a method of discriminating a finger of a user is not limited to the foregoing method. For example, the user may wear an individual sensor-attached cap or the like on each finger so that a sensor position detection unit can trace the sensor to discriminate the finger used to perform the touch operation.

In step S305, the recognition unit 203 specifies the position touched by the user (touch position) and holds information indicating the specified position. In the present exemplary embodiment, based on the information on the fingers detected by the detection unit 202 and the information on the finger discriminated by the discrimination unit 204 as the finger used to perform the touch operation, the recognition unit 203 specifies the position of the tip of the discriminated finger at the time point of the touch operation as the touch position and holds information on the coordinates on the operation surface.

In step S306, the recognition unit 203 determines whether Tco (first threshold value) seconds have passed since the discriminated finger has started touching the operation surface. If the recognition unit 203 determines that Tco seconds have passed (YES in step S306), then the processing proceeds to step S307. On the other hand, if the recognition unit 203 determines that Tco seconds have not passed (NO in step S306), then the processing proceeds to step S319. In the present exemplary embodiment, Tco is, for example, one second.

In the present exemplary embodiment, when an object is touched, the user is performing an operation to designate the object as a target of a copying operation or a cutting operation. When no object is touched, the user is performing an operation to designate a target position of a pasting operation. Hence, in step S307, the recognition unit 203 determines whether an object is touched. In the present exemplary embodiment, based on the information on the coordinates indicating the touch position that is held in step S305, the recognition unit 203 specifies an object projected on a position corresponding to the touch position in video image information projected by the projection unit 209 controlled by the control unit 208. If the recognition unit 203 successfully specifies the object projected on the touch position, then the recognition unit 203 determines that the object is touched. If the recognition unit 203 determines that the object is touched (YES in step S307), then the processing proceeds to step S308. On the other hand, if the recognition unit 203 determines that the object is not touched (NO in step S307), then the processing proceeds to step S316.

To specify the touched object, automatic area segmentation processing, in which an image area is extracted from a document, and character string recognition processing based on optical character reader (OCR) may be used. Addition of such processing is expected to improve the accuracy of the recognition of the touched object. Further, the object projected on the specified touch position can be recognized and specified based on the video image captured by the image capturing unit 201.

In step S308, the holding unit 205 holds information on the object projected on the position corresponding to the touch position, i.e., information on the object touched by the user, to associate the object with the finger discriminated in step S304. The holding unit 205 acquires from the discrimination unit 204 the information on the discriminated finger used to perform the touch operation. The holding unit 205 also acquires from the control unit 208 the information on the touched object specified by the recognition unit 203. The holding unit 205 holds the information acquired from the discrimination unit 204 and the information acquired from the control unit 208 to associate the information acquired from the discrimination unit 204 with the information acquired from the control unit 208. When information is already associated with the finger and held, the information is overwritten to hold updated information. The information held by the recognition unit 203 includes discrimination information (for example, ID) indicating a specific finger of the user and information on the touched object such as the details, shape, size, and color of the touched object. When the object is text, details of the text and information on decorations such as a font and color are held in association with the finger used to perform the touch operation.

In step S309, the control unit 208 generates, based on the information held by the holding unit 205, a projection image in which the object associated with the finger discriminated in step S304 is projected on the discriminated finger. The control unit 208 in the present exemplary embodiment acquires the information indicating the position of the finger detected by the detection unit 202. Then, based on the information held by the holding unit 205, the control unit 208 generates a projection image in which the object associated with the detected finger is projected on the indicated position. At this time, the control unit 208 makes adjustments such as reduction of the projection size and conversion into a simplified index so that the object associated with each finger of the user can fit an area on the finger associated with the object.

In step S310, the projection unit 209 acquires the projection image generated by the control unit 208 and projects the acquired projection image on the work space. At that time, the control unit 208 and the projection unit 209 trace the position of the hand of the user detected by the detection unit 202, and when the user moves the hand, the control unit 208 and the projection unit 209 follow the movement of the hand to continue to project the associated object on the finger of the user.

In step S311, the recognition unit 203 determines whether Tcu (second threshold value) seconds have passed without termination of the touch by the discriminated finger since the discriminated finger has started touching the operation surface. If the recognition unit 203 determines that Tcu seconds have passed without termination of the touch since the discriminated finger has started touching the operation surface (YES in step S311), then the processing proceeds to step S313. On the other hand, if the recognition unit 203 determines that the touch was terminated after Tco seconds had passed but before Tcu seconds had passed since the start of the touch by the discriminated finger (NO in step S311), then the processing proceeds to step S312. In the present exemplary embodiment, Tcu is, for example, two seconds.

With the information processing apparatus according to the present exemplary embodiment, the user can touch a specific object included in electronic data for Tco seconds or longer and shorter than Tcu seconds to perform an operation to copy the touched object. In the present exemplary embodiment, the copying operation refers to the act of copying information on an object included in electronic data to a clipboard. Accordingly, the copying operation does not involve any change in the display state of the object on the electronic data. In step S312, the acceptance unit 206 accepts the copying operation as an instruction to edit the electronic data, and the processing is terminated. When copying of the object is instructed, since no change arises in the electronic data, the electronic data stored in the storage unit 207 will not be updated.

Further, in the present exemplary embodiment, the user continues to touch a specific object included in the electronic data for Tcu seconds or longer to perform an operation to cut the touched object. In the present exemplary embodiment, the cutting operation refers to the act of copying information on an object included in electronic data to a clipboard and cutting the object from the electronic data. In step S313, the acceptance unit 206 accepts the cutting operation as an instruction to edit the electronic data. When cutting of the object is instructed, there arises a change that the object is deleted from the display content of the electronic data. Thus, when further instructed to store the edited electronic data, the acceptance unit 206 updates the electronic data stored in the storage unit 207. The storage of the edited electronic data may be executed in response to acceptance of a separate instruction through a different gesture operation or may be executed automatically upon acceptance of the editing operation.

In step S314, the control unit 208 generates a projection image from which the object touched by the user is deleted. In the present exemplary embodiment, the control unit 208 deletes the object touched continuously by the user from the electronic data included in the projection image projected by the projection unit 209. Then, the control unit 208 projects on the operation surface the electronic data from which the touched object is deleted, and generates an image in which the object associated with the finger of the user is projected on the finger.

In step S315, the projection unit 209 acquires the projection image generated by the control unit 208 and projects the projection image on the work space. The control unit 208 and the projection unit 209 trace the positions of the hand and the finger of the user detected by the detection unit 202, and when the user moves the hand, the control unit 208 and the projection unit 209 follow the movement of the hand to continue to project the associated object on the finger of the user.

On the other hand, if the recognition unit 203 determines in step S307 that the object is not touched and the processing proceeds to step S316, the control unit 208 refers to the information held by the holding unit 205, and if there is any information associated in the past with the finger discriminated in step S304, the control unit 208 deletes the information. Then, in step S317, the control unit 208 generates a projection image without any object projected on the discriminated finger. In other words, when the object associated in the past with the discriminated finger is projected on the discriminated finger, the control unit 208 generates a projection image from which the object projected on the finger is deleted, and the processing proceeds to step S315. If there is no information associated in the past with the finger discriminated in step S304, the processing is terminated without performing any processing in steps S316 and S317.

Further, if the recognition unit 203 recognizes no touch operation in step S303 and the processing proceeds to step S318, the control unit 208 generates a projection image in which an object associated with each detected finger is projected on the detected finger associated with the object. The control unit 208 in the present exemplary embodiment refers to the associated information held by the holding unit 205 to generate a projection image in which an object associated with each finger is projected on the finger associated with the object. At that time, the control unit 208 acquires the information indicating the position of the finger detected by the detection unit 202. Then, based on the information held by the holding unit 205, the control unit 208 generates a projection image in which the object associated with the detected finger is projected on the indicated position. At that time, the control unit 208 makes adjustments such as reduction of the projection size and conversion into a simplified index so that the object associated with each finger of the user can fit an area on the finger associated with the object.

Further, if the recognition unit 203 determines in step S306 that one second has not passed since the discriminated finger started touching the operation surface (NO in step S306), the recognition unit 203 determines in step S319 whether the touch is terminated. If the recognition unit 203 determines that the touch is terminated (YES in step S319), then the processing proceeds to step S320. On the other hand, if the recognition unit 203 determines that the touch is continued (NO in step S319), the processing returns to step S306.

In the present exemplary embodiment, the user can perform an operation to paste an object copied (or cut) in the past by terminating the touch within a period shorter than Tco seconds. In step S320, the acceptance unit 206 accepts a pasting operation as an instruction to edit the electronic data. When pasting of the object is instructed, there arises a change in the electronic data that the object is added. Thus, when further instructed to store the edited electronic data, the acceptance unit 206 updates the electronic data stored in the storage unit 207. The storage of the edited electronic data may be executed in response to acceptance of a separate instruction through a different gesture operation or may be executed automatically upon acceptance of the editing operation.

In step S321, the control unit 208 refers to the information held by the holding unit 205 to acquire the information on the object associated with the finger discriminated in step S304 by the discrimination unit 204. In other words, the control unit 208 acquires the information on the object associated with the finger used to perform the touch operation.

In step S322, the control unit 208 generates, based on the information on the object acquired in step S321, a projection image in which the object associated with the touching finger is synthesized at the touch position specified in step S305.

Then, in step S315, the projection unit 209 acquires the projection image generated by the control unit 208 and projects the projection image on the work space.

As described above, in the present exemplary embodiment, the finger of the user used to perform the touch operation is discriminated, and the information on the touched object is associated with the discriminated finger and held. Further, the copying, cutting, and pasting operations are switched according to the duration of the touch operation.

The processing will be described in which the recognition unit 203 recognizes different operations according to the duration of the touch operation.

In the present exemplary embodiment, the first threshold value Tco of the duration of the touch operation used in step S306 is set to one second, and the second threshold value Tcu of the duration of the touch operation used in step S311 is set to two seconds (duration since the start of the touch). The duration of a touch required to perform the pasting operation is shorter than Tco. The duration of a touch required to perform the copying operation is Tco or longer and shorter than Tcu. The duration of a touch required to perform the cutting operation is Tcu. The duration of the touch operation required to perform the pasting operation is set shorter than that for the copying or cutting operation, because the pasting operation is expected to be executed one or more times with respect to one execution of the copying or cutting operation. The duration of the touch required to perform the pasting operation, which is a frequently-executed operation, is set to be the shortest duration of shorter than Tco to increase the operation efficiency. Further, in order to distinguish between copying and cutting operations, the threshold value for accepting a cutting operation is set longer than the threshold value for accepting a copying operation. This is because, in the present exemplary embodiment, information on an object is copied to the clipboard regardless of whether the operation performed is a copying operation or a cutting operation. In other words, it is common processing of the copying operation and the cutting operation that the holding unit 205 holds the information on the finger used to perform the touch operation and the information on the touched object such that the finger is associated with the touched object and that the projection unit 209 projects the object on the finger used to perform the touch operation. Thus, once the duration of the touch reaches Tco, holding of object information and projection of the object on the finger are executed to complete the copying operation first. From the fact that projection of the object on the finger is started, the user can intuitively understand that the copying operation is completed. When the user further continues touching and the duration reaches Tcu, the touched object is deleted from the projected electronic data. From the fact that the touched object is no longer projected, the user can intuitively understand that execution of the cutting operation is completed. As described above, the copying operation and the cutting operation are executed in stages, and the user is provided with visual feedback through the projected video image so that the user can be notified that the duration of a touch required to perform each operation has been satisfied. This can reduce unnecessary touch time to increase the speed of editing.

A specific operation example will be described in which the user performs an operation to edit electronic data by use of the information processing apparatus according to the first exemplary embodiment, with reference to FIGS. 3 and 4.

<Copying Operation>

Figure 3A:
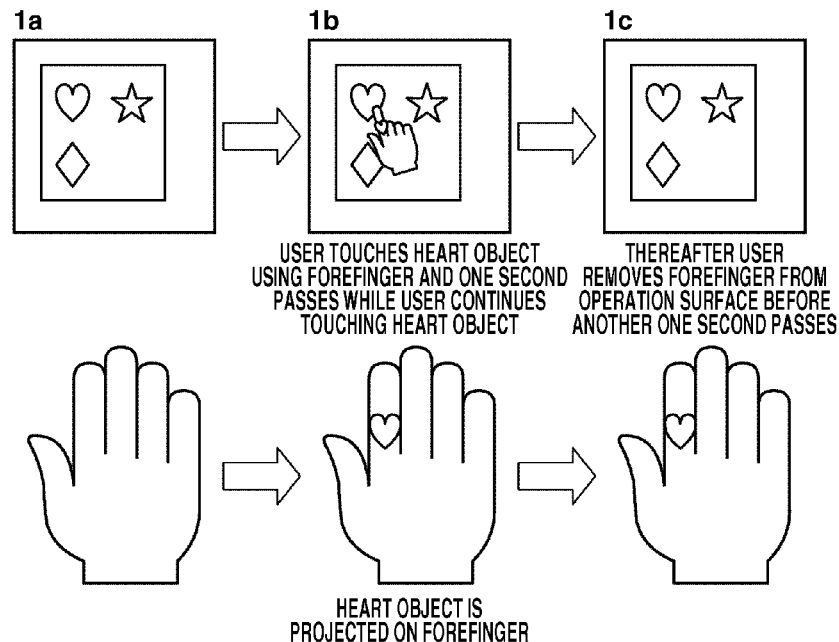
FIG. 3A illustrates an example of an operation of copying an object on a projected document.

FIG. 3A illustrates a flow of the copying operation. Work spaces 1a, 1b, and 1c in FIG. 3A each illustrate a change in the work space during the copying operation and a state of the hand of the user at each time point.

First, the projection unit 209 projects the electronic data including heart, star, and diamond objects on the operation surface (work space 1a). The user touches the heart object on the operation surface using the forefinger of the right hand. When one second passes while the touch state is continued, the holding unit 205 holds information on the forefinger associated with the heart object. Furthermore, the heart object is projected as an associated object on the forefinger of the right hand of the user (work space 1b). Thereafter, the forefinger is removed from the operation surface before another one second passes, whereby the copying operation is completed (work space 1c).

<Cutting Operation>

Figure 3B:
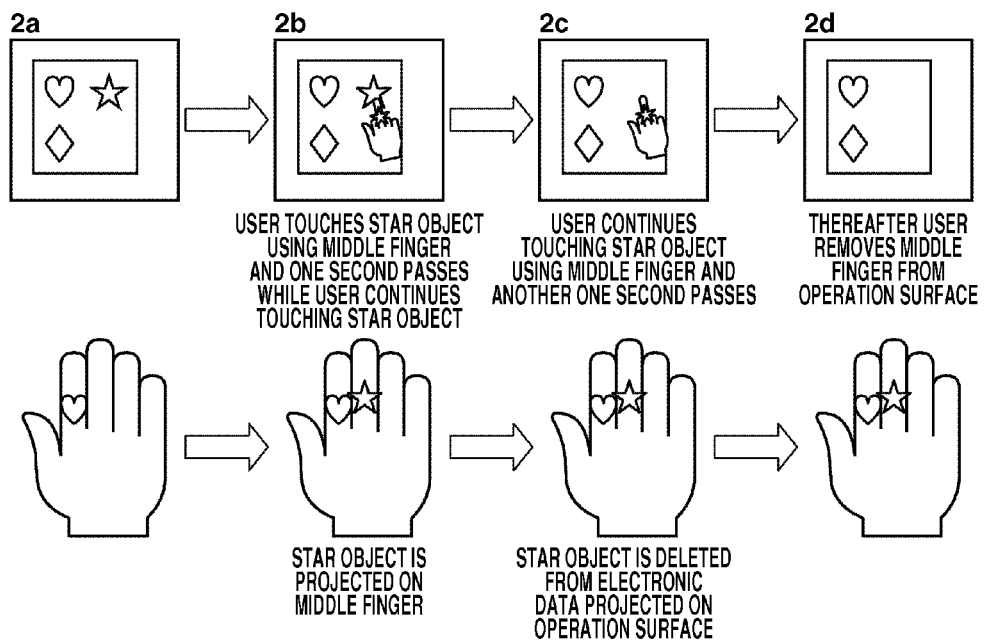
FIG. 3B illustrates an example of an operation of cutting an object on a projected document.

FIG. 3B illustrates a flow of the cutting operation. Work spaces 2a, 2b, 2c, and 2d in FIG. 3B each illustrate a change in the work space during the copying operation and a state of the hand of the user at each time point.

At the time point when the copying operation is completed, the projection unit 209 projects the heart, star, and diamond objects on the operation surface and the heart object on the forefinger of the right hand of the user in the work space (work space 2a). The user touches the star object on the operation surface using the middle finger of the right hand of the user. When one second passes while the touch state is continued, the holding unit 205 holds information on the middle finger associated with the star object. Then, the star object is newly projected as an associated object on the middle finger of the right hand of the user (work space 2b). When another one second passes while the touch state is continued, the star object is deleted from the electronic data projected on the operation surface (work space 2c). Thereafter, the user removes the middle finger from the operation surface, whereby the cutting operation is completed (work space 2d).

<Pasting Operation>

Figure 4:
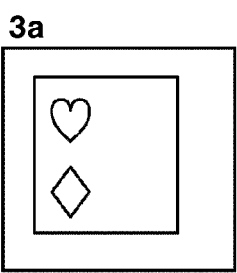
FIG. 4 illustrates an example of an operation of pasting an object onto a projected document.
Figure 4:
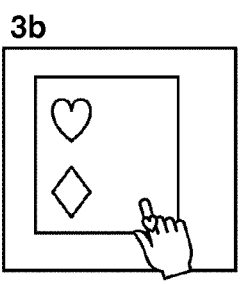
Figure 4:
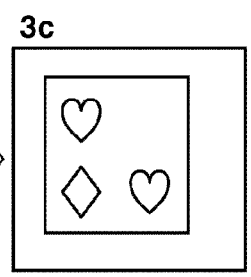
Figure 4:
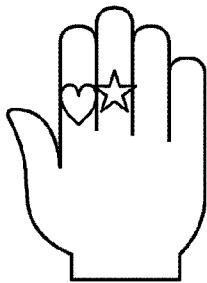
Figure 4:
Figure 4:
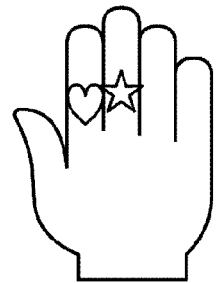

FIG. 4 illustrates a flow of the pasting operation. Work spaces 3a, 3b, and 3c each illustrate a change in the work space during the pasting operation performed following the completion of the cutting operation and a state of the hand of the user at each time point.

At the time point when the cutting operation is completed, the heart and diamond objects are projected on the operation surface, and the heart and star objects are projected on the forefinger and the middle finger of the right hand of the user, respectively (work space 3a). The user touches an arbitrary position on the operation surface using the forefinger of the right hand of the user (work space 3b). Thereafter, the user removes the forefinger from the operation surface within one second, and the object (heart) held by the holding unit 205 in association with the forefinger is projected on the touch position, whereby the pasting operation is completed (work space 3c).

Although the operation example is described in which the pasting operation is performed to paste an object into the electronic data on which the user performed the copying (or cutting) operation, it is also possible to perform the pasting operation to paste an object into another electronic data. In this case, while an operation to open another electronic data or application is performed, the projection on the finger of the user may be continued or stopped and then resumed when performance of the pasting operation becomes possible. In such a case, the user can intuitively understand that the pasting operation can be performed from the fact that the projection is resumed. Furthermore, the processing load applied to the information processing apparatus to trace the finger of the user and perform the projection can be reduced, and the burden on the human body caused by the projection onto the skin by the projector for a long time can also be reduced.

As described above, according to the exemplary embodiment of the present invention, the information processing apparatus holds the information on the copied (or cut) object to show the user a flow of movement of the object to a paste position through the projection of the object on the finger. Since the information on the object held as a result of the copying (or cutting) operation is projected on the finger used by the user to perform the operation, the user can intuitively perform an operation to copy (or cut) a plurality of objects and understand the held information. Further, the present exemplary embodiment realizes operations to copy, cut, or paste a plurality of objects in random order. Especially, by performing the touch operation using an arbitrary finger, the user can determine a target object or position of the operation concurrently with setting the discrimination information with respect to the held information. The present exemplary embodiment can provide an intuitive user interface system configured to perform editing operations such as copying, cutting, and pasting with respect to electronic data.

Although in the present exemplary embodiment, the copying, cutting, and pasting operations are discriminated based on the duration of the touch operation, the present invention is not limited thereto, and the copying, cutting, and pasting operations may be discriminated based on the number of touch operations performed within a certain period. For example, if a portion is touched once, released, and not touched again within 0.5 seconds, then this operation is discriminated as a pasting operation. If a portion is touched once, released, and touched again within 0.5 seconds, then this operation is discriminated as a copying operation. If a portion is touched once, released, touched again within 0.5 seconds, and touched again within another 0.5 seconds, then this operation is discriminated as a cutting operation. This modification does not necessitate waiting for a period of time to elapse in the touched state and, thus, produces an effect of increasing the speed of the editing operation. It is also possible to discriminate the copying, cutting, and pasting operations based on voice recognition. For example, while touching an object that the user desires to copy (or cut) or a paste position using an arbitrary finger, the user produces a voice corresponding to each operation, thereby performing the operation. This modification also produces effects of increasing the speed of the editing operation and simplifying the editing operation.

Further, although in the present exemplary embodiment, when the user touches for one second or longer a position where no object is projected, the information associated in the past with the finger used to perform the operation is deleted, the present invention is not limited thereto. When the user touches for one second or longer a position where no object is projected, the processing may be terminated based on an assumption that the user does not intend to perform an editing operation.

Further, although in the present exemplary embodiment, when a captured video image includes images of a hand and fingers, the movement of the hand is followed to continuously project the associated object on the finger, the object may be projected only when, for example, the movement of the hand stops. This enables projection of an object copied (or cut) while the hand and fingers are not moving, during which more stable calculation results can be obtained, even when the accuracy of detection of a moving hand and moving fingers is low. Furthermore, the process of synthesizing a projected video image with respect to a finger area can be omitted to reduce the amount of calculation.

Further, although in the present exemplary embodiment, the editing operation is performed on the electronic data projected on the operation surface, the present invention is not limited thereto. The present invention is also applicable to an editing operation with respect to a video image displayed on an ordinary display apparatus. In this case, the control unit 208 performs a display control on the display apparatus. This prevents a phenomenon that projection light from the projector 106 is blocked by a hand of the user to make the projected video image difficult to see. Furthermore, the present exemplary embodiment is not limited to the editing operation with respect to electronic document data and is also applicable to an operation such as a video image editing operation and folder management.

Further, the present exemplary embodiment may be applied to an editing operation to combine a video image projected by the projector with a real object placed in the work space. For example, a paper document is placed in the work space, and an object touched by the user for one second or longer is copied. Information on the touched object is held to associate the touched object with the finger used to touch the touched object, and the copied object is projected on the hand of the user. This visual feedback in response to the copying operation enables provision of an intuitive user interface system for an operation to copy a real object or an object written on a real object.

Further, although, in the present exemplary embodiment, the finger of the user is discriminated to hold the information on the finger used to perform the touch operation to associate the finger with the touched object, the present exemplary embodiment is also applicable to a touch operation performed using a plurality of members instead of a plurality of fingers. For example, a plurality of members such as touch pens and pointers may be used to perform operations to copy (or cut) a plurality of objects.

Further, although, in the present exemplary embodiment, the projector is used to project the object on the finger area, the present invention is not limited thereto, and a head mount display (HMD) may be used. In this case, an object can be superimposed on a finger area in an HMD video image, or an object can be associated with a finger and displayed at an area near the finger. This enables application to an electronic data editing operation on a mixed reality (MR) system.

In the first exemplary embodiment, the information on the finger used to perform the touch operation and the information on the touched object are held so as to associate the finger with the object, and the object associated with the finger is projected on the finger, whereby the user is provided with the information on the object to be copied (or cut). At this time, the size of the projected object is reduced as necessary so that the object can be projected on each finger of the user. In a second exemplary embodiment, a projection method is switched according to the posture of a finger of the user.

FIG. 1A, which illustrates the hardware configuration of the first exemplary embodiment, also illustrates a hardware configuration of the second exemplary embodiment. Further, FIG. 1B, which illustrates the functional configuration of the first exemplary embodiment, also illustrates a functional configuration of the present exemplary embodiment. However, the recognition unit 203 in the second exemplary embodiment can recognize the posture of the hand of the user by pattern matching of data on the shapes of human hands in different postures learned in advance with the hand of the user detected by the detection unit 202. Then, based on the matching with data on the shapes indicating gesture patterns learned in advance by the information processing apparatus, the recognition unit 203 recognizes a predetermined gesture operation performed using a finger.

Figure 5:
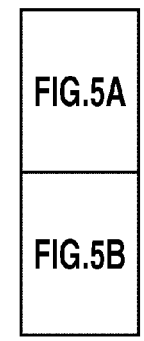
FIG. 5 (5A+5B) is a flow chart illustrating an example of processing of controlling an electronic data editing operation executed by the information processing apparatus.
Figure 5A:
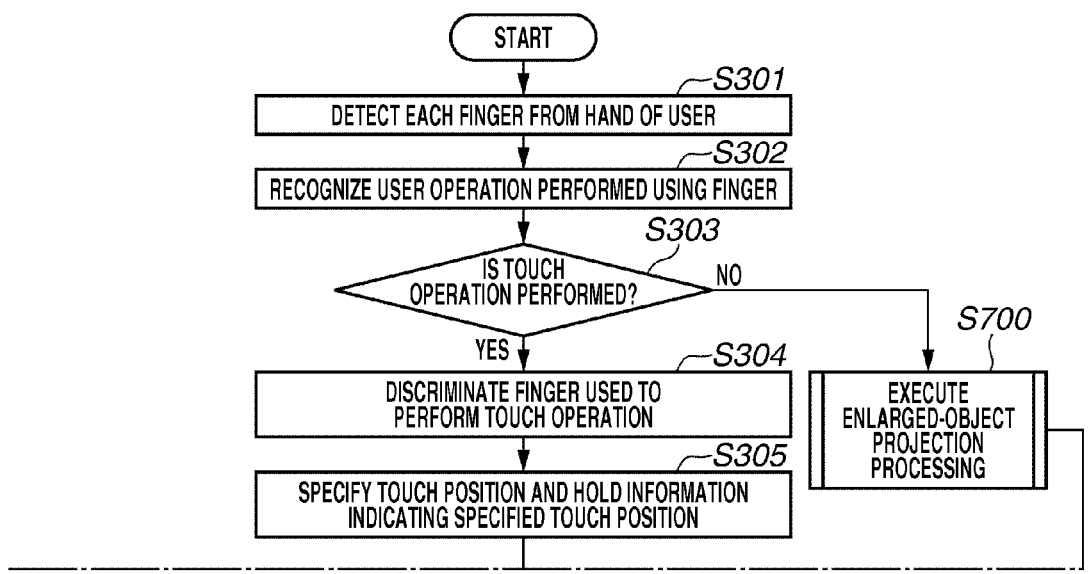
Figure 5B:
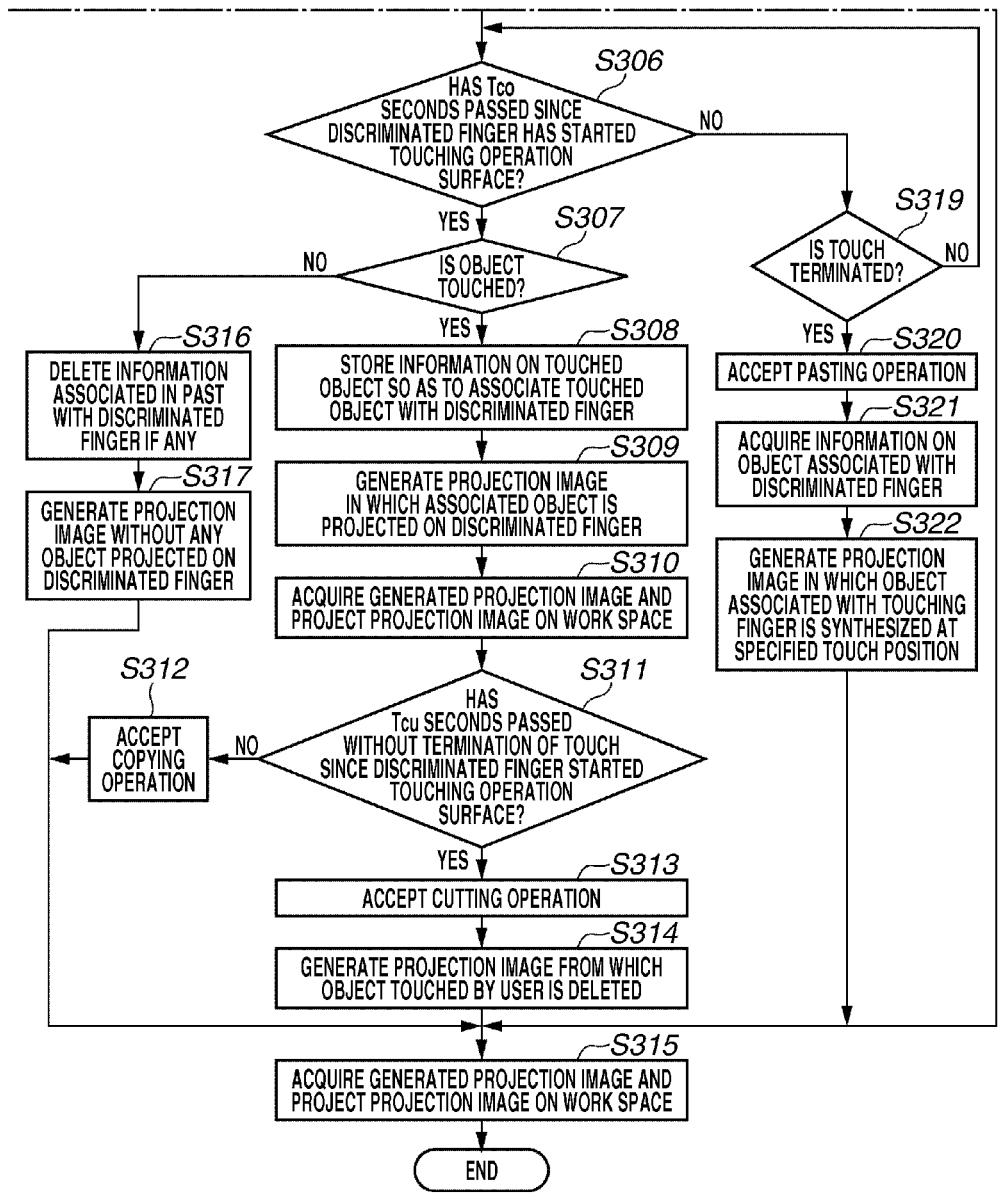

FIG. 5 (5A+5B) is a flow chart illustrating an example of a flow of processing of controlling an electronic data editing operation executed by the information processing apparatus according to the present exemplary embodiment. In the processing steps denoted by the same reference numerals as those in FIG. 3, similar processing is performed as in FIG. 3. Hence, detailed descriptions thereof are omitted, and the present exemplary embodiment will describe different points from the first exemplary embodiment.

In the present exemplary embodiment, if the recognition unit 203 does not recognize a touch operation in step S303, then the processing proceeds to step S700, and the information processing apparatus executes an enlarged-object projection processing.

FIG. 6 is a flow chart illustrating an example of a flow of the enlarged-object projection processing executed by the information processing apparatus in step S700.

First, in step S701, the recognition unit 203 tracing the fingers of the user determines whether the user has performed a gesture of bending at least one finger. In the present exemplary embodiment, the recognition unit 203 recognizes the postures of the hand and fingers of the user by pattern matching of data on the shapes of human hands and fingers learned in advance with the hand and fingers of the user detected by the detection unit 202. Hence, when the recognition unit 203 performs pattern matching of the data on the shapes of a hand with at least one finger being bent with the hand of the user detected by the detection unit 202, if the likelihood is equal to or higher than a threshold value, then the recognition unit 203 determines that at least one finger is bent. Since a bent finger appears to be shorter from the back side of the hand than a finger that is not bent, the recognition unit 203 can determine that the user bends a finger by tracing an area where the fingers are shown in the video image captured by the image capturing unit 201 to detect a change in length. If the recognition unit 203 determines that the user has performed a gesture of bending at least one finger (YES in step S701), then the processing proceeds to step S702. If the recognition unit 203 determines that the user has not bent any finger (NO in step S701), then the processing proceeds to step S709.

In step S702, the discrimination unit 204 discriminates the bent finger. In the present exemplary embodiment, first, the discrimination unit 204 specifies the finger that is detected in step S701 as being bent. Then, based on the relative position of the specified finger with respect to the back of the hand, the discrimination unit 204 discriminates a finger touching the operation surface and holds information indicating the discriminated finger.

In step S703, the control unit 208 acquires from the holding unit 205 the information on the object associated with the discriminated finger.

In step S704, the control unit 208 determines whether the number of objects to be targeted in the processing, that is to say, the number of objects associated with the bent fingers is one. In the present exemplary embodiment, when the number of bent fingers is one, the number of objects to be targeted is one. On the other hand, when a plurality of fingers is bent, information on a plurality of objects is acquired in step S703. When a finger with which no object is associated is bent, a blank object is counted in the number of objects to be targeted in the processing. If the control unit 208 determines that the number of objects to be targeted in the processing is one (YES in step S704), then the processing proceeds to step S705. On the other hand, if the control unit 208 determines that a plurality of objects is to be targeted in the processing (NO in step S704), then the processing proceeds to step S707.

In step S705, the control unit 208 generates a projection image in which the object associated with the bent finger is synthesized at a central position of the back of the hand. Based on the information on the object acquired in step S703, the control unit 208 projects the object on the center of the back of the hand of the user detected by the detection unit 202. At that time, the control unit 208 makes adjustments such as enlargement of the projection size of the object so that the associated object can fit an area on the back of the hand and can be larger than the object projected on a finger.

In step S706, the control unit 208 generates a projection image in which an object associated with each finger of the user that is not bent is synthesized on each finger that is not bent in the projection image generated in step S705. When the projection image is generated, the processing returns to the main processing. Then, in step S315, the projection unit 209 projects the projection image generated in step S706, and the processing is terminated.

On the other hand, if the control unit 208 determines in step S704 that a plurality of objects is to be targeted in the processing, in step S707, the control unit 208 divides the area of the back of the hand, and determines an area to project the object associated with each discriminated finger. For example, when the forefinger and the middle finger of the right hand are bent, the back of the hand is divided into right and left areas, and the control unit 208 determines to project the object associated with the forefinger on the left and the object associated with the middle finger on the right so that the positional relation between the objects is the same as the positional relation between the corresponding fingers.

In step S708, the control unit 208 generates a projection image in which each object is synthesized at each determined position, and the processing proceeds to step S706 described above.

Further, when the recognition unit 203 determines in step S701 that the user has not performed a gesture of bending at least one finger and the processing proceeds to step S709, the recognition unit 203 determines whether the user has performed a gesture of bringing all fingers of one hand into close contact with each other. In the present exemplary embodiment, the recognition unit 203 performs matching of the data on the shape of a hand with all fingers being in close contact with each other, which is learned in advance, with the hand in the captured video image detected by the detection unit 202. If the likelihood is equal to or higher than a threshold value, then the recognition unit 203 determines that all fingers of the hand are in close contact with each other. If the recognition unit 203 determines that the user has performed a gesture of bringing all fingers of one hand into close contact with each other (YES in step S709), then the processing proceeds to step S710. On the other hand, if the recognition unit 203 determines that not all fingers are in close contact with each other (NO in step S709), then the processing proceeds to step S712.

In step S710, the control unit 208 divides an area of the entire hand and determines an area to display the object associated with each finger. The control unit 208 acquires from the holding unit 205 the information on all objects associated with the fingers of the hand detected by the detection unit 202. Then, the control unit 208 determines projection positions so that the objects are evenly projected in a same size on the entire hand with all fingers being in close contact with each other. For example, when the control unit 208 acquires the objects associated with four fingers, the forefinger, the middle finger, the ring finger, and the little finger, of the right hand, respectively, the control unit 208 divides the entire hand into four areas of upper left, upper right, lower left, and lower right areas, and determines to place the objects one by one from the upper left area to the lower right area, starting with the object corresponding to the finger on the left hand side.

In step S711, the control unit 208 generates a projection image in which each object is synthesized at the determined position, and the processing proceeds to step S706 described above. At that time, the control unit 208 makes adjustments such as enlargement of the projection size of the object so that the associated object can fit an area of the entire hand and can be larger than the object projected on a finger.

On the other hand, if the recognition unit 203 determines in step S709 that not all fingers are in close contact with each other and the processing proceeds to step S712, the control unit 208 generates a projection image in which the object associated with each detected finger is projected on each detected finger. At that time, the control unit 208 refers to the associated information held by the holding unit 205 to acquire the information indicating the positions of the fingers detected by the detection unit 202. Then, the control unit 208 generates a projection image in which the object associated with each finger is placed on the finger associated with the object. At that time, the control unit 208 makes adjustments such as reduction of the projection size of the object so that the associated object can fit an area of each finger of the user. When the control unit 208 finishes generating the projection image, the processing proceeds to step S706 described above.

As described above, in the present exemplary embodiment, when the object is associated with each finger of the user as a result of a copying (or cutting) operation, only the object associated with the bent finger is projected in an enlarged size on the back of the hand in response to the gesture of bending the finger. Furthermore, in the present exemplary embodiment, all objects associated with the fingers of the hand are placed next to each other and displayed in a same size on the entire hand in response to the gesture of bringing all fingers of one hand into close contact with each other.

As described above, in the present exemplary embodiment, the stored contents of the clipboard are projected in an enlarged size based on the postures of the hand and fingers.

An operation example will be specifically described in which the information processing apparatus according to the present exemplary embodiment projects an object copied (or cut) by the user, with reference to FIGS. 7A to 7C. In the operation example illustrated in FIGS. 7A to 7C, a heart object, a star object, a diamond object, and a circle object are associated with the forefinger, the middle finger, the ring finger, and the little finger of the right hand of the user, respectively.

<Gesture Operation of Bending One Finger>

FIG. 7A illustrates an operation example in which the user performs a gesture of bending one finger. The heart object, the star object, the diamond object, and the circle object are projected on the forefinger, the middle finger, the ring finger, and the little finger, respectively (4a in FIG. 7A). Then, the user bends the middle finger. As a result, the control unit 208 projects the star object associated with the middle finger in enlarged size on the center of the back of the hand (4b in FIG. 7A).

<Gesture Operation of Bending a Plurality of Fingers>

FIG. 7B illustrates an operation example in which the user performs a gesture of bending a plurality of fingers. First, the heart object, the star object, the diamond object, and the circle object are projected on the forefinger, the middle finger, the ring finger, and the little finger, respectively (5a in FIG. 7B). Then, the user bends the middle finger and the ring finger. As a result, the star object and the diamond object corresponding to the middle finger and the ring finger, respectively, which are stored in the clipboard, are projected in an enlarged size on the back of the hand. In the present exemplary embodiment, the star object associated with the middle finger, which is positioned closer to the leftmost finger, is projected on the left hand side, and the diamond object associated with the ring finger, which is positioned closer to the rightmost finger, is projected on the right hand side (5b in FIG. 7B).

<Gesture Operation of Bringing all Fingers of One Hand into Close Contact with Each Other>

FIG. 7C illustrates an operation example in which the user performs a gesture operation of bringing all fingers of one hand into close contact with each other. First, the heart object, the star object, the diamond object, and the circle object are projected on the forefinger, the middle finger, the ring finger, and the little finger, respectively (6a in FIG. 7C). Then, the user brings all fingers into close contact with each other. As a result, all objects (heart, star, diamond, circle) associated with the fingers of the right hand are evenly projected in a same size on the area of the entire hand including the fingers. In the present exemplary embodiment, the area is divided into four areas of upper left, lower left, upper right, and lower right areas, and the objects are placed one by one from the upper left area to the lower right area, starting with the object corresponding to the finger on the left hand side (6b in FIG. 7C).

As described above, in the present exemplary embodiment, when the objects are associated with the fingers of the user as a result of a copying (or cutting) operation, only the object associated with the bent finger is projected in an enlarged size on the back of the hand in response to the gesture operation of bending a finger. Further, when a plurality of objects is displayed in an enlarged size, the objects are projected at positions based on the positional relation between the fingers. This enables the user to intuitively understand which object is associated with which finger. Moreover, since only a specific object is projected in an enlarged size on the back of the hand, which is larger in area than the fingers, it is easy to confirm the details of the copied (or cut) object. This is an advantageous effect. Further, in the present exemplary embodiment, the objects associated with the fingers of the hand are placed next to each other and projected in a same size on the entire hand in response to the gesture operation of bringing all fingers of one hand into close contact with each other. This enables the user to confirm at first glance the plurality of objects currently held by the holding unit 205 as a result of a copying (or cutting) operation. Further, when a plurality of objects is displayed in an enlarged size, a predetermined rule is employed, and the objects are projected on the positions based on the positional relation between the fingers. This enables the user to intuitively understand which object is associated with which finger. Furthermore, since the user can confirm the object projected in a larger size than that of the object projected on a finger, it is easy to understand the details of the copied (or cut) object. This is also an advantageous effect. As described above, the present exemplary embodiment can provide an intuitive user interface system configured to perform edition operations, such as copying, cutting, and pasting, on electronic data.

The present invention improves operability of the operation of a plurality of objects.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-127144 filed Jun. 4, 2012, which is hereby incorporated by reference herein in its entirety.

What is claimed is:

1. An information processing apparatus comprising:
a display control unit configured to display an image including an object on an operation surface;
a recognition unit configured to recognize a position in the image which is designated by an input from a user;
an acceptance unit configured to accept different editing operations with respect to the object according to a length of duration during which the position recognized by the recognition unit is continuously designated, when the object is displayed at the position recognized by the recognition unit,
wherein the acceptance unit distinctively accepts as the different editing operations at least a copying operation to copy the object and a cutting operation to cut the object from the image; and
a projection control unit configured to project the object on a finger of the user.

2. The information processing apparatus according to claim 1,
wherein the copying operation is an operation to instruct the information processing apparatus to store information on the object in a storage area, and the cutting operation is an operation to instruct the information processing apparatus to store the information on the object in the storage area and to delete the object from the image; and
wherein in response to acceptance of the cutting operation by the acceptance unit, the display control unit deletes the object from the image displayed on the operation surface.

3. The information processing apparatus according to claim 2, wherein the acceptance unit accepts the copying operation when the duration is longer than a first threshold value, and accepts the cutting operation when the duration is longer than a second threshold value, which is longer than the first threshold value.

4. The information processing apparatus according to claim 3, wherein when the duration during which the position in the image which is recognized by the recognition unit is continuously designated by the input from the user is shorter than the first threshold value, the acceptance unit accepts a pasting operation to paste the object copied in response to the copying operation or the object cut in response to the cutting operation at the position recognized by the recognition unit.

5. The information processing apparatus according to claim 1, wherein the recognition unit recognizes a position in the image which is touched by the finger of the user, the information processing apparatus further comprising:
a discrimination unit configured to discriminate the finger used by the user to touch the position among a plurality of fingers; and
a holding unit configured to hold in a storage area the information on the object when the object is displayed at the touched position recognized by the recognition unit, so as to associate the object with the finger discriminated by the discrimination unit.

6. The information processing apparatus according to claim 5, wherein when the user bends at least one finger, the discrimination unit discriminates the at least one bent finger, and based on the information held by the holding unit, the projection control unit projects the object associated with the at least one discriminated finger in an enlarged size on a back of a hand of the user so that the object is larger than the object projected on the finger of the user.

7. The information processing apparatus according to claim 6, wherein when the user bends a single finger, the projection control unit projects the object associated with the single finger on a center of the back of the hand of the user, and when the user bends a plurality of fingers, the projection control unit projects the objects associated with the plurality of bent fingers on the back of the hand of the user at positions respectively corresponding to the plurality of bent fingers according to a positional relation between the plurality of bent fingers.

8. The information processing apparatus according to claim 6, wherein when the user brings all fingers of one hand of the user into close contact with each other, the projection control unit projects on the hand all objects associated with the respective fingers of the hand based on the information held by the holding unit.

9. An information processing apparatus comprising:
a discrimination unit configured to discriminate a member used to designate an object displayed on an operation surface among at least two or more members;
a display control unit configured to display an index indicating the designated object on the member discriminated as having been used to designate the object; and
a projection control unit configured to project the designated object on a finger of the member discriminated.

10. The information processing apparatus according to claim 9, wherein the index is displayed to clearly indicate to the user that the object designated by the member can be pasted at a position on the operation surface designated by the member.

11. The information processing apparatus according to claim 10, further comprising an acceptance unit configured to accept different editing operations with respect to the object according to a length of duration during which the object displayed on the operation surface is continuously designated by the member,
wherein the acceptance unit distinctively accepts as the different editing operations at least a copying operation to copy the object and a cutting operation to cut the object from the image.

12. An information processing apparatus comprising:
a recognition unit configured to recognize an operation performed by a user;

a discrimination unit configured to discriminate a finger used by the user to perform the operation among a plurality of fingers;

a holding unit configured to hold information on a specific object when the recognition unit recognizes that the user performs an operation to touch the specific object among objects on the operation surface using the finger so as to associate the information on the touched object with the finger discriminated by the discrimination unit; and a projection control unit configured to cause a projection unit to project on the finger of the user discriminated by the discrimination unit the object associated with the finger, based on the information held by the holding unit.

13. The information processing apparatus according to claim 12, further comprising an acceptance unit configured to distinctively accept different editing operations with respect to the object according to a length of duration during which the user continues touching the object using a finger among a plurality of fingers, wherein the acceptance unit distinctively accepts a copying operation to copy the object when the duration is longer than a first threshold value, and accepts a cutting operation to cut the object from an image when the duration is longer than a second threshold value, which is longer than the first threshold value.

14. A method of controlling an information processing apparatus, comprising:

displaying an image including an object on an operation surface;

recognizing a position in the image designated by an input from a user; and accepting different editing operations with respect to the object according to a length of duration during which the recognized position is continuously designated, when the object is displayed at the recognized position, wherein at least a copying operation to copy the object and a cutting operation to cut the object from the image are distinctively accepted as the different editing operations; and projecting the object on a finger of the user.

15. A method of controlling an information processing apparatus, comprising:

discriminating a member used to designate an object displayed on an operation surface among at least two members; and displaying an index indicating the designated object on the member discriminated as being used to designate the object; and projecting the designated object on a finger of the member discriminated.

16. A method of controlling an information processing apparatus, comprising:

recognizing an operation performed by a user;

discriminating a finger used by the user to perform the operation among a plurality of fingers;

holding information on a specific object when an operation performed by the user to touch the specific object among objects on the operation surface using the finger is recognized so as to associate the information on the touched object with the discriminated finger; and projecting on the discriminated finger the object associated with the discriminated finger, based on the information held by the holding unit.

17. A non-transitory computer-readable storage medium storing a program read and executed by a computer to cause the computer to operate as the information processing apparatus according to claim 1.

18. A non-transitory computer-readable storage medium storing a program read and executed by a computer to cause the computer to operate as the information processing apparatus according to claim 9.

19. A non-transitory computer-readable storage medium storing a program read and executed by a computer to cause the computer to operate as the information processing apparatus according to claim 12.

* * * * *